United States Patent
Yamazaki

(10) Patent No.: US 10,871,577 B2
(45) Date of Patent: Dec. 22, 2020

(54) POSITIONING METHOD, POSITIONING SYSTEM, CORRECTION INFORMATION GENERATION METHOD, CORRECTION INFORMATION GENERATION DEVICE, AND POSITIONING SYSTEM RELAY STATION AND TERMINAL

(71) Applicant: PANASONIC INTELLECTUAL PROPERTY MANAGEMENT CO., LTD., Osaka (JP)

(72) Inventor: Yasuhisa Yamazaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 15/525,160

(22) PCT Filed: Feb. 26, 2016

(86) PCT No.: PCT/JP2016/001045
§ 371 (c)(1),
(2) Date: May 8, 2017

(87) PCT Pub. No.: WO2016/152030
PCT Pub. Date: Sep. 29, 2016

(65) Prior Publication Data
US 2018/0203129 A1 Jul. 19, 2018

(30) Foreign Application Priority Data
Mar. 24, 2015 (JP) .................. 2015-060363

(51) Int. Cl.
*G01S 19/41* (2010.01)
*G01S 19/51* (2010.01)
(Continued)

(52) U.S. Cl.
CPC .............. *G01S 19/41* (2013.01); *G01S 19/07* (2013.01); *G01S 19/071* (2019.08);
(Continued)

(58) Field of Classification Search
CPC ..... H04B 7/18554; G01S 19/41; G01S 19/51; G01S 19/07
See application file for complete search history.

(56) References Cited

U.S. PATENT DOCUMENTS 5,899,957 A * 5/1999 Loomis ................... G01S 19/04
340/988
6,091,358 A * 7/2000 Maniscalco ............ G01C 15/00
342/357.57

(Continued)

FOREIGN PATENT DOCUMENTS

DE   10200500638 A1 * 8/2006 .......... A01B 79/005
DE   102005006389 A1   8/2006
(Continued)

OTHER PUBLICATIONS

Translation of DE102005006389A1. Obtained via ESPACENET on Feb. 1, 2019. (Year: 2005).*
Search Report and Written Opinion issued in International Patent Application No. PCT/JP2016/001045, dated May 24, 2016.
Extended European Search Report, dated Mar. 1, 2018, by the European Patent Office (EPO) for the related European Patent Application No. 16767942.2.

*Primary Examiner* — Jeffrey C Boomer
(74) *Attorney, Agent, or Firm* — Greenblum & Bernstein, P.L.C.

(57) ABSTRACT

The present disclosure can perform positioning of a terminal even though a communication bandwidth capable of being used by a reference station is narrow. In a positioning method, a positioning system, a correction information generation method, and a correction information generation apparatus of the present disclosure, coordinates of a terminal are positioned by using the reference station, a plurality of relay stations communicating with the reference station, and
(Continued)

the terminal communicating with the relay station. In the positioning method, the positioning system, the correction information generation method, and the correction information generation apparatus of the present disclosure, information for specifying the relay station communicating with the terminal is acquired, and the correction information is generated based on the positioning signal from a satellite which is received by the reference station based on the coordinates of the relay station communicating with the terminal. In the positioning method and the positioning system of the present disclosure, the reference station transmits the correction information to the terminal via the relay station.

8 Claims, 7 Drawing Sheets

(51) Int. Cl.
*H04B 7/185* (2006.01)
*G01S 19/07* (2010.01)
(52) U.S. Cl.
CPC ............ *G01S 19/073* (2019.08); *G01S 19/51* (2013.01); *H04B 7/18554* (2013.01)

(56) References Cited

U.S. PATENT DOCUMENTS

| | | | |
|---|---|---|---|
| 6,263,281 B1* | 7/2001 | Yamamoto | G01S 5/009 342/357.59 |
| 2003/0158650 A1* | 8/2003 | Abe | G01C 21/20 701/420 |
| 2006/0133375 A1* | 6/2006 | Napierala | H04L 12/1877 370/390 |
| 2007/0027583 A1* | 2/2007 | Tamir | G06Q 30/0283 701/1 |
| 2009/0168681 A1* | 7/2009 | Moon | H04L 12/1854 370/312 |
| 2010/0240346 A1* | 9/2010 | Jain | H04W 4/029 455/414.1 |
| 2011/0034175 A1* | 2/2011 | Fong | H04B 7/024 455/450 |

FOREIGN PATENT DOCUMENTS

| | | |
|---|---|---|
| JP | 2002-116246 | 4/2002 |
| JP | 2005-172738 | 6/2005 |

* cited by examiner

POSITIONING METHOD, POSITIONING SYSTEM, CORRECTION INFORMATION GENERATION METHOD, CORRECTION INFORMATION GENERATION DEVICE, AND POSITIONING SYSTEM RELAY STATION AND TERMINAL

TECHNICAL FIELD

The present disclosure relates to a positioning method, a positioning system, a correction information generation method, a correction information generation apparatus, and a relay station and a terminal of the positioning system.

BACKGROUND ART

PTL 1 discloses a mobile station that performs relative positioning by selectively using correction information related to a virtual base point positioned near a position of the mobile station among a plurality of correction information items sent from an antenna station within a coverage in which the mobile station is present.

CITATION LIST

Patent Literature

PTL 1: Japanese Patent Unexamined Publication No. 2005-172738

SUMMARY OF THE INVENTION

The present disclosure can perform positioning of the terminal even though a communication bandwidth capable of being used by the reference station is narrow.

In a positioning method, a positioning system, a correction information generation method, and a correction information generation apparatus of the present disclosure, coordinates of a terminal are positioned by using a reference station, a plurality of relay stations communicating with the reference station, and the terminal communicating with the relay station. In the positioning method, the positioning system, the correction information generation method, and the correction information generation apparatus of the present disclosure, information for specifying the relay station communicating with the terminal is acquired, and the correction information is generated based on the positioning signal from a satellite which is received by the reference station based on the coordinates of the relay station communicating with the terminal. In the positioning method and the positioning system of the present disclosure, the reference station transmits the correction information to the terminal via the relay station.

The relay station and the terminal of the positioning system are used within the positioning system described above.

The positioning method, the positioning system, the correction information generation method, the correction information generation apparatus, and the relay station and the terminal of the positioning system are useful in positioning the terminal even though a communication bandwidth capable of being used by the reference station is narrow.

DESCRIPTION OF EMBODIMENTS

Figure 1:
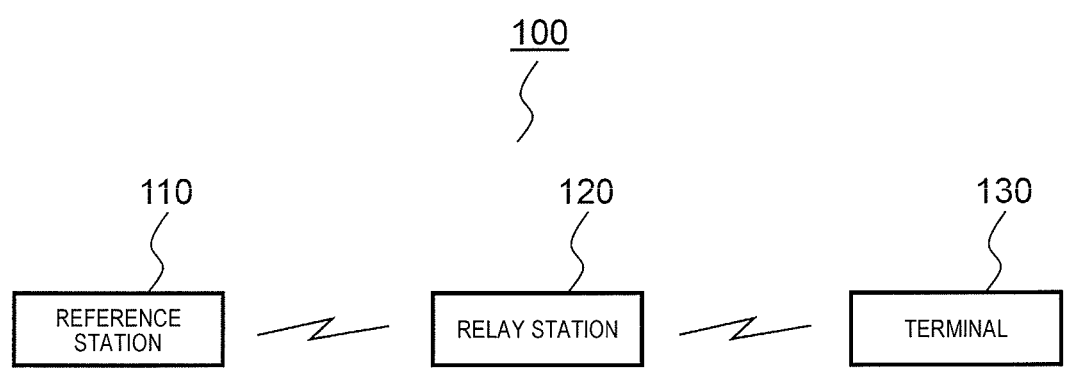
FIG. 1 is a conceptual diagram of a positioning system according to Exemplary Embodiment 1.

Hereinafter, an exemplary embodiment will be described in detail by appropriately referring to the drawings. Here, unnecessarily detailed description may be omitted. For example, the detailed description of the already well-known matters or the redundant description of the substantially same configurations may be omitted. By doing this, the following description is prevented from being unnecessarily redundant, and thus, those skilled in the art can easily understood the present disclosure.

The accompanying drawings and the following description are provided to allow those skilled in the art to sufficiently the present disclosure, and are not intended to limit the subject matters described in claims.

Exemplary Embodiment 1

Hereinafter, Exemplary Embodiment 1 will be described with reference to FIGS. 1 to 9.

1-1. Configuration

FIG. 1 is a conceptual diagram of a positioning system according to Exemplary Embodiment 1.

Positioning system 100 includes reference station 110, relay station 120, and terminal 130.

Coordinates of reference station 110 on Earth are already known. Coordinates of relay station 120 on Earth are also already known. Terminal 130 is present in a place of which coordinates on Earth are desired to be calculated.

Reference station 110 communicates with relay station 120. Relay station 120 communicates with terminal 130. In the present exemplary embodiment, a plurality of relay stations 120 is present between reference station 110 and terminal 130. Relay station 120 relays correction information transmitted from reference station 110 in a bucket brigade system, and transmits the correction information to terminal 130. Such a network configuration is generally called a multi-hop network.

Positioning system 100 calculates coordinates of terminal 130 on Earth by determining a location of terminal 130 by the correction information.

In the present exemplary embodiment, an example in which reference station 110 independently generates the correction information will be described. That is, an example in which the reference station serves as a correction information generation apparatus will be described. However, an apparatus (such as a dedicated computer or a general-purpose computer) that generates the correction information by being connected to the reference station in a wireless or wired manner corresponds to the correction information generation apparatus.

Figure 2:
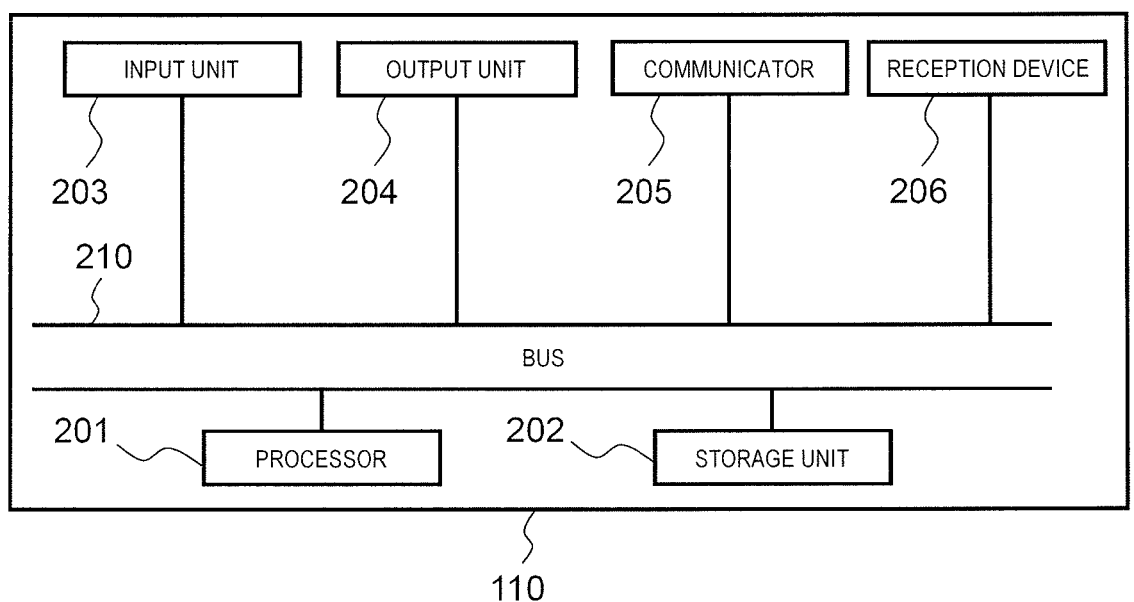
FIG. 2 is a block diagram of a reference station according to Exemplary Embodiment 1.

FIG. 2 is a block diagram of the reference station according to Exemplary Embodiment 1.

Reference station 110 includes processor 201, storage unit 202, input unit 203, output unit 204, communicator 205, reception device 206, and bus 210.

Processor 201 controls other elements of reference station 110 through bus 210. As an example, processor 201 may be constituted by a general-purpose central processing unit (CPU). Processor 201 may execute a predetermined program. Processor 201 executes the predetermined program, and thus, the reference station is operated.

Storage unit 202 acquires various information items from other elements, and retains the information items temporally or permanently. Storage unit 202 is a generic term of a so-called primary storage device and a so-called secondary storage device, and multiple storage units 202 may be physically provided. For example, a direct random access memory (DRAM), a hard disk drive (HDD), or a solid state drive (SSD) is used as storage unit 202.

Input unit 203 receives information from the outside. The information received by input unit 203 from the outside includes information regarding an input from an operator of reference station 110. As one example, input unit 203 may be constituted by an input interface such as a keyboard.

Output unit 204 presents information to the outside. The information presented by the output unit includes information regarding the positioning. As one example, output unit 204 may be constituted by an existing output interface such as a display.

Communicator 205 communicates with an external device through a communication path. The device communicating with communicator 205 includes relay station 120. As one example, communicator 205 may be constituted by a communication interface communicating with an existing communication network such as a 3G communication network, a wireless LAN communication network, or a wireless communication network using an ultra-short wave (30 MHz to 0.3 GHz).

Reception device 206 includes a receive antenna, and a demodulator. The reception device receives a positioning signal from a positioning satellite. In the present exemplary embodiment, a GPS satellite is used as one example of the positioning satellite. The GPS satellite transmits an L1 signal (1575.42 MHz) or an L2 signal (1227.60 MHz), as the positioning signal. A receiver demodulates the positioning signal received by the reception device.

The configuration of reference station 110 described above is an example. The reference station may be constituted by integrating some of the respective components of reference station 110. The reference station may be constituted by dividing some of the respective components of reference station 110 into a plurality of elements. Some of the respective components of reference station 110 may be omitted. The reference station may be constituted by adding other elements to reference station 110.

Figure 3:
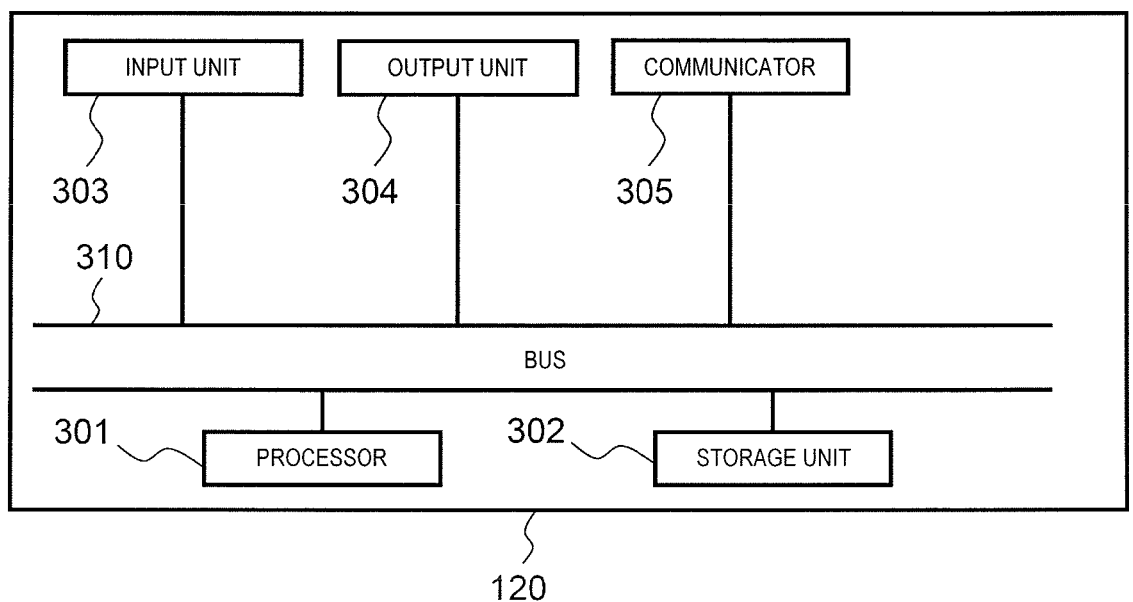
FIG. 3 is a block diagram of a relay station according to Exemplary Embodiment 1.

FIG. 3 is a block diagram of the relay station according to Exemplary Embodiment 1.

Relay station 120 includes processor 301, storage unit 302, input unit 303, output unit 304, communicator 305, and bus 310.

Processor 301 controls other elements of relay station 120 through bus 310. As an example, processor 301 may be constituted by a general-purpose CPU. Processor 301 may execute a specific program. Processor 301 executes the specific program, and thus, relay station 120 is operated.

Storage unit 302 acquires various information items from other elements, and retains these information items temporarily or permanently. Storage unit 302 may be a generic term of a so-called primary storage device and a so-called secondary storage device, and multiple storage units 302 may be physically provided. For example, DRAM, HDD, or SSD is used as storage unit 302.

Input unit 303 receives information from the outside. The information received by input unit 303 from the outside includes information regarding an input from an operator of relay station 120. As one example, input unit 303 may be constituted by an input interface such as a keyboard.

Output unit 304 presents information to the outside. The information presented by the output unit includes information regarding the positioning. As one example, output unit 304 may be constituted by an existing output interface such as a display.

Communicator 305 communicates with an external device through a communication path. The device communicating with communicator 305 includes reference station 110 and terminal 130. As one example, communicator 305 may be constituted by a communication interface communicating with an existing communication network such as a 3G communication network, a wireless LAN communication network, or a wireless communication network using an ultra-short wave.

The configuration of relay station 120 described above is an example. The terminal may be constituted by integrating some of the respective components of relay station 120. The relay station may be constituted by dividing some of the respective components of relay station 120 into a plurality of elements. Some of the respective components of relay station 120 may be omitted. The relay station may be constituted by adding other elements to relay station 120.

Figure 4:
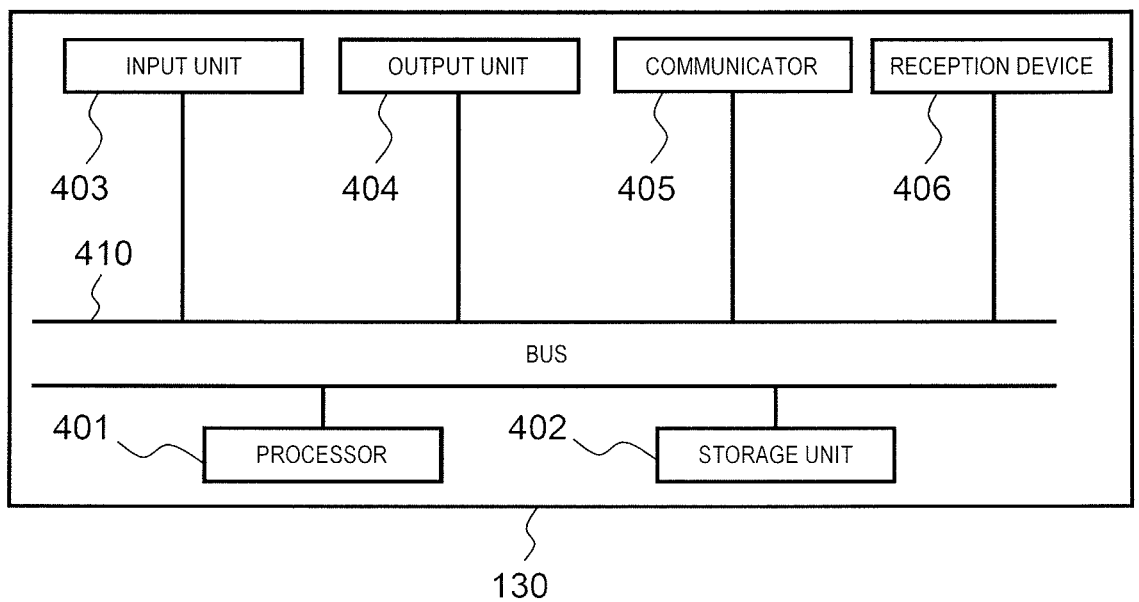
FIG. 4 is a block diagram of a terminal according to Exemplary Embodiment 1.

FIG. 4 is a block diagram of the terminal according to Exemplary Embodiment 1.

Terminal 130 includes processor 401, storage unit 402, input unit 403, output unit 404, communicator 405, reception device 406, and bus 410.

Processor 401 controls other elements of terminal 130 through bus 410. As an example, processor 401 may be constituted by a general-purpose CPU. Processor 401 may execute a specific program. Processor 401 executes the specific program, and thus, terminal 130 is operated.

Storage unit 402 acquires various information items from other elements, and retains these information items temporarily or permanently. Storage unit 402 may be a generic term of a so-called primary storage device and a so-called secondary storage device, and multiple storage units 402 may be physically provided. For example, DRAM, HDD, or SSD is used as storage unit 402.

Input unit 403 receives information from the outside. The information received by input unit 403 from the outside includes information regarding an input from an operator of terminal 130. As one example, input unit 403 may be constituted by an input interface such as a keyboard.

Output unit 404 presents information to the outside. The information presented by the output unit includes information regarding the positioning. As one example, output unit 404 may be constituted by an existing output interface such as a display.

Communicator 405 communicates with an external device through a communication path. The device communicating with communicator 405 includes relay station 120. As one example, communicator 405 may be constituted by a communication interface communicating with an existing communication network such as a 3G communication network, a wireless LAN communication network, or a wireless communication network using an ultra-short wave.

Reception device 406 includes a receive antenna, and a demodulator. The reception device receives a positioning signal from a positioning satellite. In the present exemplary embodiment, a GPS satellite is used as one example of the positioning satellite. The GPS satellite transmits an L1 signal or an L2 signal as the positioning signal. A receiver demodulates the positioning signal received by the reception device.

The configuration of terminal 130 described above is an example. The terminal may be constituted by integrating some of the respective components of terminal 130. The terminal may be constituted by dividing some of the respective components of terminal 130 into a plurality of elements. Some of the respective components of terminal 130 may be omitted. The terminal may be constituted by adding other elements to terminal 130.

1-2. Operation

A positioning process performed by the positioning system having the above-described configuration will be described.

Figure 5:
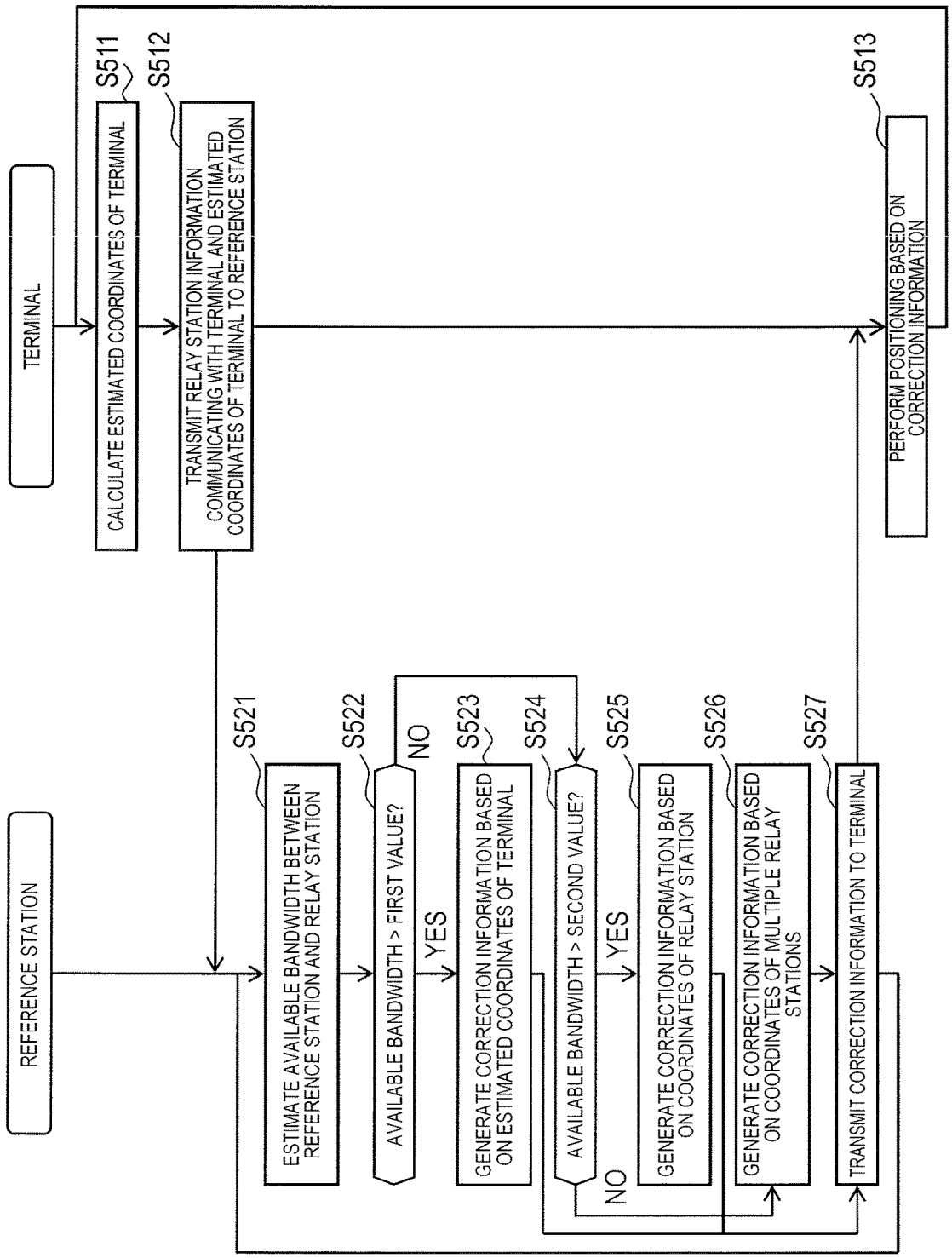
FIG. 5 is a flowchart showing a positioning process according to Exemplary Embodiment 1.

FIG. 5 is a flowchart showing the positioning process according to Exemplary Embodiment 1.

In step S511, processor 401 of terminal 130 calculates an estimated coordinates of terminal 130. The estimated coordinates are calculated by processor 401 based on the positioning signal received by reception device 406. The process of calculating the estimated coordinates based on the positioning signal is generally known as code positioning. In the code positioning, processor 401 analyzes (1) a code (pattern of 0 and 1) indicating the positioning signal and (2) a time when the satellite transmits the code, and thus, the estimated coordinates are calculated. The estimated coordinates calculated through the code positioning include an error due to influence of the ionosphere.

In step S512, processor 401 transmits information of relay station 120 communicating with terminal 130 and the estimated coordinates calculated in step S511 to reference station 110 through communicator 205. The information of relay station 120 communicating with terminal 130 includes information for identifying relay station 120 communicating with terminal 130. As an example of the information for identifying relay station 120 communicating with terminal 130, there is an ID of relay station 120. Relay station 120 transmits the ID for identifying the relay station to the terminal communicating with the relay station. In the present exemplary embodiment, processor 401 transmits the ID as the information of relay station 120 communicating with terminal 130 to reference station 110.

Figure 6:
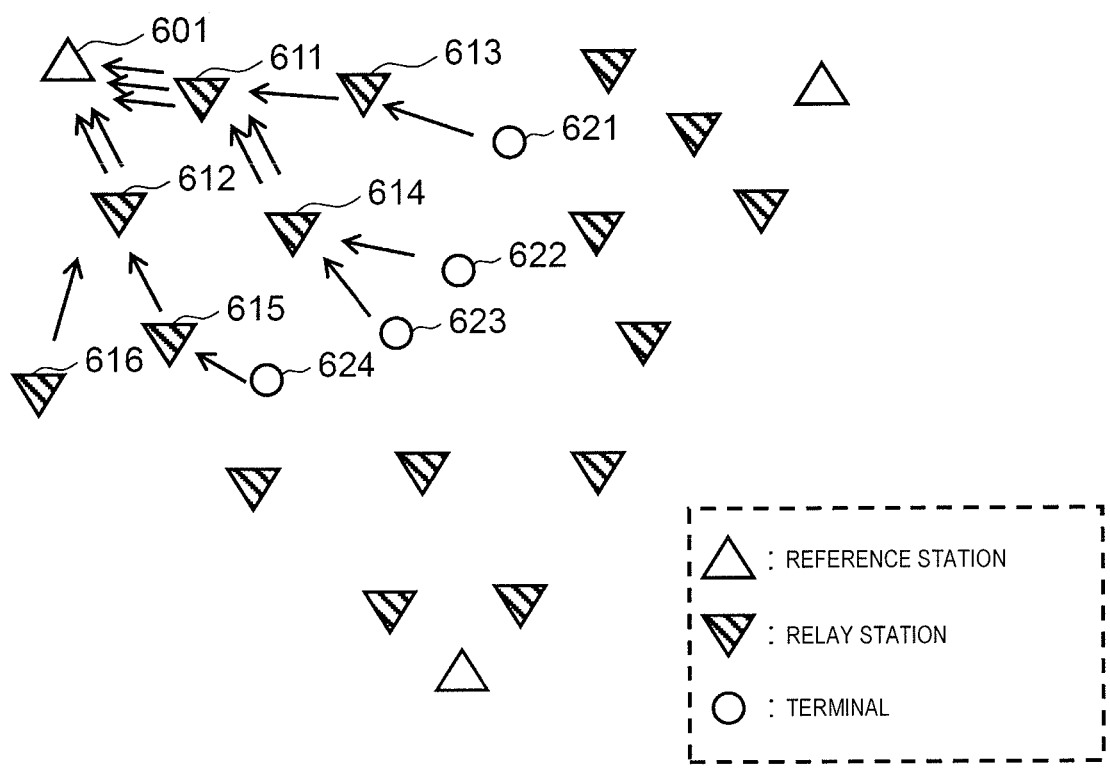
FIG. 6 is a diagram showing a flow of data transmission from the terminal to the reference station according to Exemplary Embodiment 1.

FIG. 6 is a diagram showing a flow of data transmission from the terminal to the reference station according to Exemplary Embodiment 1. Arrows depicted by FIG. 6 represent directions of data. As shown in FIG. 6, terminal 621 transmits the information of the relay station communicating with the terminal and the estimated coordinates calculated in step S511 to reference station 601 via relay station 613 and relay station 611. Terminal 622 and terminal 623 transmit the information items of the relay stations communicating with these terminals and the estimated coordinates calculated in step S511 to reference station 601 via relay station 614 and relay station 611. Terminal 624 transmits the information of the relay station communicating with the terminal and the estimated coordinates calculated in step S511 to reference station 601 via relay station 615 and relay station 612. Relay station 616 transmits information indicating that there is no terminal communicating with the relay station to reference station 601 via relay station 612.

In step S521, processor 201 of reference station 110 estimates an available bandwidth between the reference station and relay station 120. The available bandwidth between the reference station and relay station 120 refers to the amount of information per unit time capable of being transmitted and received between the reference station and the relay station communicating with the reference station. The example shown in FIG. 6 will be described. In FIG. 6, reference station 601 communicates with relay station 611 and relay station 612. Thus, in step S521, reference station 601 estimates the available bandwidths between relay station 611 and relay station 612. As the estimation of the available bandwidth, a known technology may be used. For example, a method of estimating the available bandwidth by transmitting packets from reference station 110 to relay station 120 while increasing a data amount and observing a time of arrival the packets corresponding to the data amount may be used. In the present disclosure, the estimation of the available bandwidth is not necessarily performed. For example, the estimation of the available bandwidth may not be performed by previously recording the available bandwidth between reference station 110 and relay station 120 in storage unit 202.

In step S522, processor 201 of reference station 110 determines whether or not the available bandwidth estimated in step S521 is greater than a first value. As a criterion of the first value, there is a value of a bandwidth in which correction information (to be described below) is able to be transmitted to all the reference stations that receive the information in step S512. By doing this, processor 201 determines whether or not a value acquired by multiplying the data amount of correction information items by the number of terminals is able to be transmitted within a predetermined unit time.

In step S523 (YES in step S522), processor 201 of reference station 110 generates the correction information based on the estimated coordinates of the terminal received in step S512. The correction information refers to information for improving positioning precision of terminal 130 by using this correction information. The correction information is calculated based on a certain point. As a point at which the correction information is calculated becomes closer to actual coordinates of the terminal, the positioning precision of terminal 130 is improved by the correction information. As an example of the correction information, there is virtual point data used in a real time kinematics (RTK) method. The virtual point data used in the RTK method is data indicating data of the positioning signal received by a virtual terminal if the virtual terminal that receives the positioning signal from the positioning satellite is present at a virtual point. The RTK method is one positioning method called interferometric positioning. The interferometric positioning is a method of calculating the coordinates of the terminal with high precision based on a difference between wavelengths of the positioning signal received by the reference station of which the coordinates are known and the positioning signal received by the terminal. In general, in the interferometric positioning, as a distance between the reference station and the terminal becomes smaller, the positioning precision is high. Thus, in recent years, the RTK method may be performed by defining the virtual point near the terminal and using the virtual point data. Such a method is also referred to as a virtual reference station (VRS)-RTK method.

If step S523 is ended, the process proceeds to step S527. In step S527 after step S523 is ended, reference station 110 transmits correction information items individually generated for terminal 130 to terminal 130. A flow of the transmission will be described with reference to the drawing.

Figure 7:
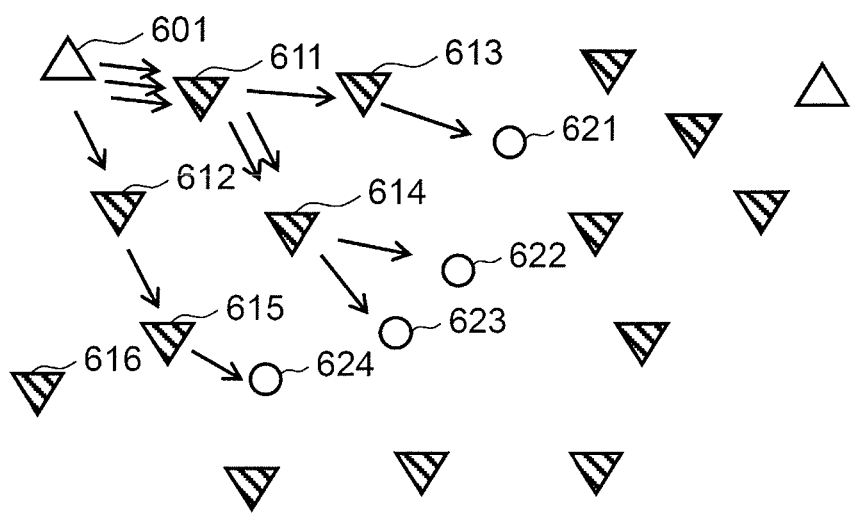
FIG. 7 is a diagram showing a flow of transmitting individually generated correction information from the reference station to the terminal according to Exemplary Embodiment 1.
Figure 7:
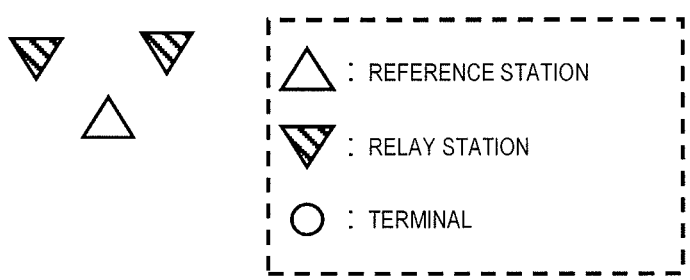

FIG. 7 is a diagram showing a flow of transmitting individually generated correction information items to the terminal from the reference station according to Exemplary Embodiment 1. In FIG. 7, arrows represent paths through which the correction information is transmitted. As shown in FIG. 7, the correction information items generated based on the estimated coordinates of terminal 621, terminal 622, and terminal 623 are transmitted to relay station 611 from reference station 601. The correction information generated based on the estimated coordinates of terminal 621 is transmitted to relay station 613 from relay station 611. The correction information generated based on the estimated coordinates of terminal 621 is transmitted to terminal 621 from relay station 613. The correction information items generated based on the estimated coordinates of terminal 622 and terminal 623 are transmitted to relay station 614 from relay station 611. The correction information generated based on the estimated coordinates of terminal 622 is transmitted to terminal 622 from relay station 614. The correction information generated based on the estimated coordinates of terminal 623 is transmitted to terminal 623 from relay station 614. The correction information generated based on the estimated coordinates of terminal 624 is transmitted to relay station 612 from reference station 601. The correction information generated based on the estimated coordinates of terminal 624 is transmitted to relay station 615 from relay station 612. The correction information generated based on the estimated coordinates of terminal 624 is transmitted to terminal 624 from relay station 615. Reference station 601 does not transmit the correction information to relay station 616 (via relay station 612). The reason is because there is no terminal communicating with relay station 616.

In step S524 (NO in step S522), processor 201 of reference station 110 determines whether or not the available bandwidth estimated in step S521 is greater than a second value. The second value is a value smaller than the first value. A criterion of the second value, there is a value of a bandwidth in which the correction information (to be described below) is able to be transmitted to the reference station communicating with the terminal among the reference stations that receive the information in step S512. By doing this, processor 201 determines whether or not a value acquired by multiplying the data amount of the correction information by the number of relay stations is able to be transmitted within a predetermined unit time.

In step S525 (YES in step S524), processor 201 of reference station 110 generates the correction information based on the coordinates of relay station 120. In the present exemplary embodiment, it is assumed that the coordinates of relay station 120 are recorded in storage unit 202 of reference station 110. The relay station for which reference station 110 generates the correction information is a relay station communicating with the terminal. The relay station communicating with the terminal is typically present at a distance within a predetermined range. There is a possibility that the correction information generated based on the coordinates of relay station 120 will be inferior to the correction information generated in step S523, but it is possible to cause terminal 130 to perform the positioning with sufficient precision.

If step S525 is ended, the process proceeds to step S527. In step S527 after step S525 is ended, reference station 110 transmits the correction information generated for each relay station to terminal 130. A flow of the transmission will be described with reference to the drawing.

Figure 8:
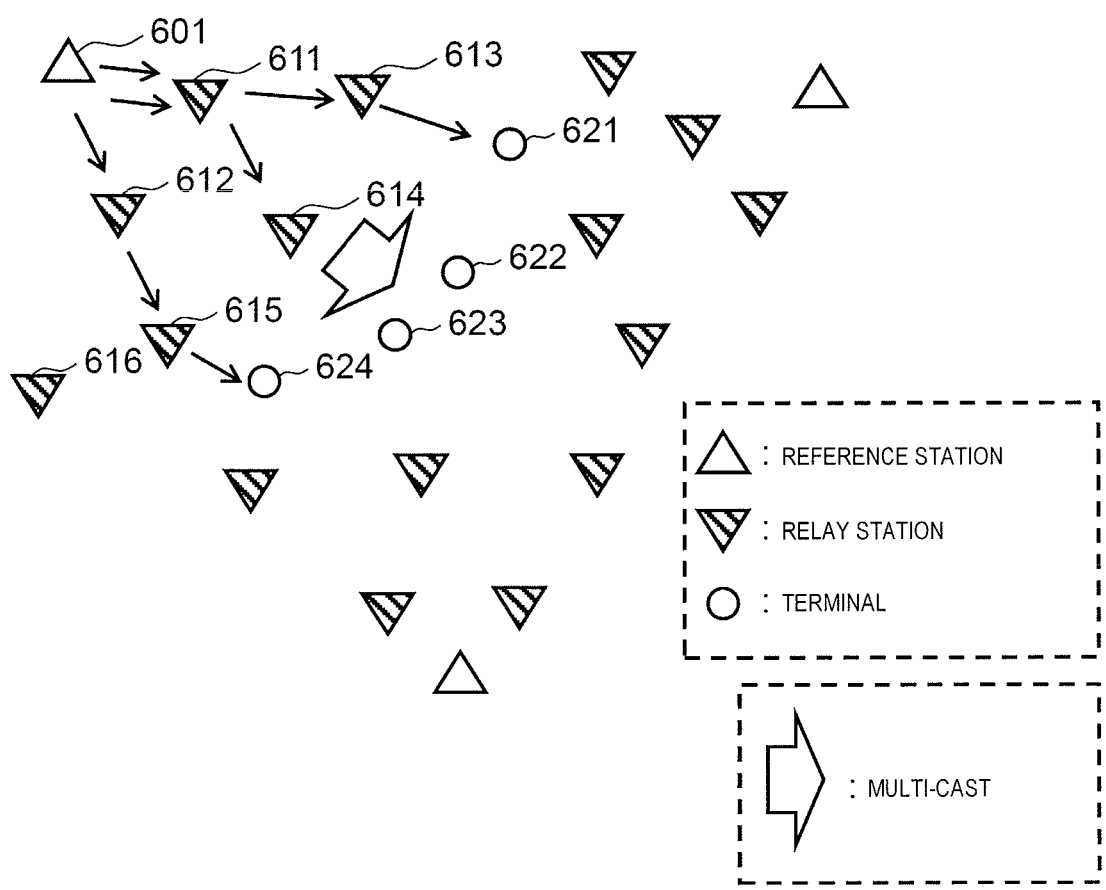
FIG. 8 is a diagram showing a flow of transmitting correction information generated for each relay station from the reference station to the terminal according to Exemplary Embodiment 1.

FIG. 8 is a diagram showing a flow of transmitting the correction information generated for each relay station from the reference station to the terminal according to Exemplary Embodiment 1. In FIG. 8, arrows represent paths through which the correction information is transmitted. Particularly, in FIG. 8, white arrows represent paths through which the correction information is transmitted through multi-cast (broadcast transmission). A bandwidth required to transmit one correction information item to one relay station or terminal and a bandwidth required to multi-cast one correction information item are substantially the same. In the present exemplary embodiment, it is assumed that the correction information is transmitted through multi-cast in a case where the same correction information is transmitted to a plurality of reception sides from a transmission side. As shown in FIG. 8, the correction information items generated based on the coordinates of relay station 613 and relay station 614 are transmitted to relay station 611 from reference station 601. The correction information generated based on coordinates of relay station 613 is transmitted to relay station 613 from relay station 611. The correction information generated based on the coordinates of relay station 613 is transmitted to terminal 621 from relay station 613. The correction information generated based on the coordinates of relay station 614 is transmitted to relay station 614 from relay station 611. The correction information generated based on the coordinates of relay station 614 is transmitted through multi-cast to terminal 622 and terminal 623 from relay station 614. The correction information generated based on the coordinates of relay station 615 is transmitted to relay station 612 from reference station 601. The correction information generated based on the coordinates of relay station 615 is transmitted to relay station 615 from relay station 612. The correction information generated based on the coordinates of relay station 615 is transmitted to terminal 624 from relay station 615. As compared with FIG. 7, it can be seen in FIG. 8 that (1) a communication amount from reference station 601 to relay station 611 and relay station 612 is reduced, (2) a communication amount from relay station 611 to relay station 614 is reduced, and (3) a communication amount from relay station 614 to terminal 622 and terminal 623 is reduced. (1) and (2) described above are advantages exhibited by generating the correction information for each relay station, and (3) is an advantage exhibited by performing multi-cast transmission in addition to the generation of the correction information for each relay station. That is, the multi-cast transmission is not necessarily performed in the present disclosure, but is useful in reducing the communication amount and the calculation amount of the relay station in a case where the multi-cast transmission is performed.

In step S526 (NO in step S524), processor 201 of reference station 110 generates the correction information based on the coordinates of a plurality of relay stations. The plurality of relay stations refers to a set of relay stations communicating with the terminal. The correction information based on the coordinates of the plurality of relay stations refers to correction information generated based on an intermediate point (average coordinates) of the coordinates of the relay stations or average coordinates acquired by adding a weight corresponding to the number of terminals. In a case where the correction information is generated based on the coordinates of the plurality of relay stations, the individual correction information items of the relay stations used in the generation are not generated. In the present exemplary embodiment, an example in which the correction information is generated for coordinates of an intermediate point of three points of relay station 613, relay station 614, and relay station 615 will be described. Accordingly, unlike step S525, it is not necessary to generate the correction information based on the coordinates of relay station 613, relay station 614, and relay station 615. Here, processor 201 can flexibly determine how long an intermediate point is distant from the relay station depending on the available bandwidth. For example, in a case where a quotient of (available bandwidth)÷(bandwidth required to transmit correction information) is n (integer), the correction information may be generated based on average coordinates of a necessary number of relay stations until the number of correction information items ultimately generated by processor 201 reaches n. For example, in a case where n is 2, the correction information may be generated for an intermediate point of coordinates of only relay station 613 and relay station 614, and the correction information may be generated for relay station 615 based on the coordinates of relay station 615. Relay stations 120 are typically positioned within a predetermined range. There is a possibility that the correction information generated based on the coordinates of the plurality of relay stations 120 will be inferior to the correction information items generated in step S523 and step S525, but it is possible to cause terminal 130 to perform the positioning with sufficient precision.

If step S526 is ended, the process proceeds to step S527. In step S527 after step S526 is ended, reference station 110 transmits the correction information generated based on the coordinates of the plurality of relay stations to terminal 130. A flow of the transmission will be described with reference to the drawing.

Figure 9:
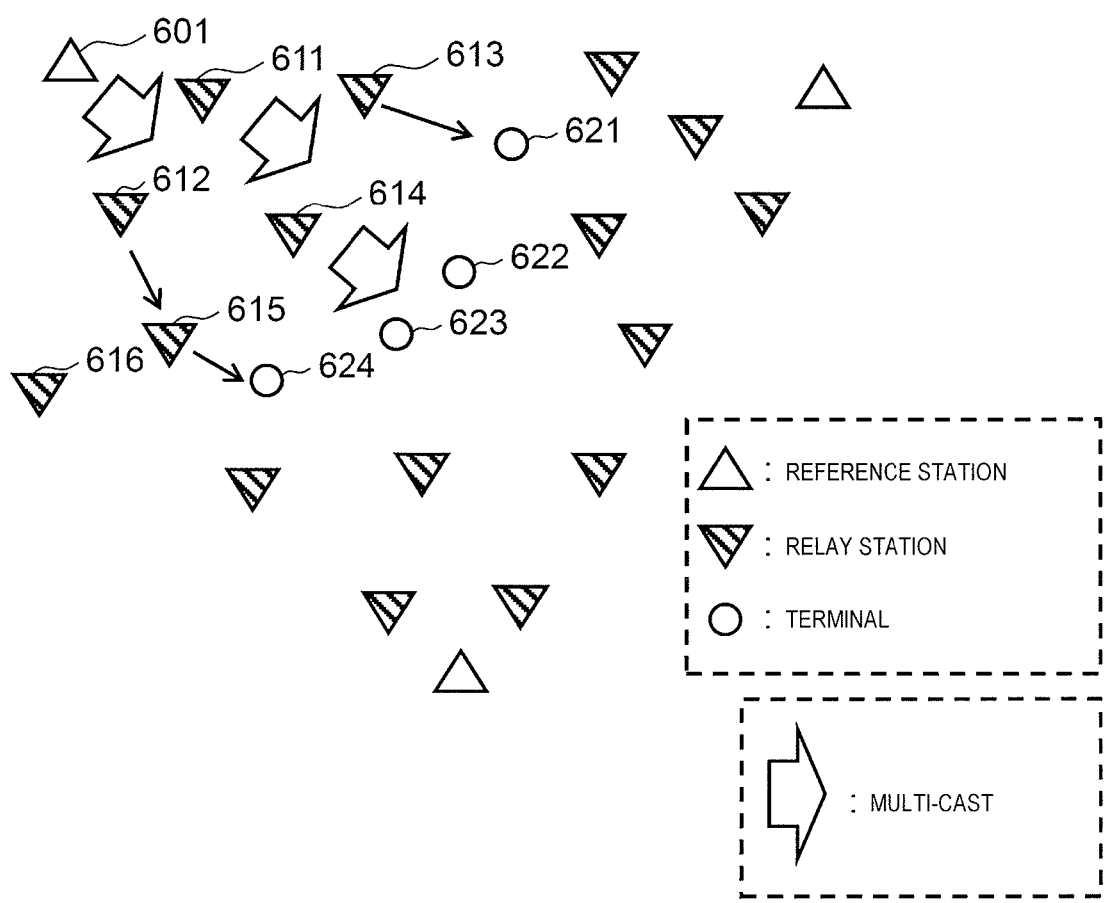
FIG. 9 is a diagram showing a flow of transmitting correction information generated based on coordinates of a plurality of relay stations from the reference station to the terminal according to Exemplary Embodiment 1.

FIG. 9 is a diagram showing a flow of transmitting the correction information generated based on the coordinates of the plurality of relay stations to the terminal from the reference station according to Exemplary Embodiment 1. In FIG. 9, arrows represent paths through which the correction information is transmitted. Similarly to FIG. 8, in FIG. 9, white arrows represent paths through which the correction information is transmitted through multi-cast. As shown in FIG. 9, the correction information (simply referred to as correction information in this paragraph) generated based on the coordinate of the intermediate point of three points of relay station 613, relay station 614, and relay station 615 is transmitted to relay station 611 and relay station 612 from reference station 601 through multi-cast. The correction information is transmitted to relay station 613 and relay station 614 from relay station 611 through multi-cast. The correction information is transmitted to terminal 621 from relay station 613. The correction information is transmitted to terminal 622 and terminal 623 from relay station 614 through multi-cast. The correction information is transmitted to relay station 615 from relay station 612. The correction information is transmitted to terminal 624 from relay station 615. As compared with FIG. 8, it can be seen in FIG. 9 that (1) a communication amount to relay station 611 and relay station 612 from reference station 601 is reduced, and (2) a communication amount to relay station 613 and relay station 614 from relay station 611 is reduced. (1) stated above is an advantage exhibited by performing multi-cast transmission in addition to the generation of the correction information based on the coordinates of the plurality of relay stations. As for (1), the communication amount is further reduced than that in the example of FIG. 8 even though the multi-cast is not performed. The reason is because in a case where the multi-cast is not performed, the transmission to relay station 611 and relay station 612 from reference station 601 is performed two times. (2) stated above is an advantage exhibited by performing multi-cast transmission in addition to the generation of the correction information based on the coordinates of the plurality of relay stations. That is, as stated above, the multi-cast transmission is not necessarily performed in the present disclosure, but is useful in reducing the communication amount and the calculation amount of the relay station in a case where the multi-cast transmission is performed.

If the process of step S527 is ended, processor 201 returns to the process of step S521. Subsequently, the processes from step S521 to step S527 are repeated.

In step S513, processor 401 of terminal 130 receives the correction information transmitted in step S527, and performs the positioning based on the correction information.

If the process of step S513 is ended, processor 401 returns to the process of step S511. Subsequently, the processes from step S511 to step S513 are repeated.

1-3. Advantages

As mentioned above, in the present exemplary embodiment, according to the positioning method, the positioning system, the correction information generation method, and the correction information generation apparatus of the present disclosure, the coordinates of the terminal are positioned by using the reference station, the plurality of relay stations communicating with the reference station, and the terminal communicating with the relay station. According to the positioning method, the positioning system, the correction information generation method, and the correction information generation apparatus of the present disclosure, information for specifying the relay station communicating with the terminal is acquired, and the correction information is generated based on the positioning signal from a satellite which is received by the reference station based on the coordinates of the relay station communicating with the terminal. According to the positioning method and the positioning system of the present disclosure, the reference station transmits the correction information to the terminal via the relay station.

Accordingly, the necessity for the transmission of the correction information is reduced as many as the number of terminals. Accordingly, even though a bandwidth capable of being used by the reference station is narrow, it is possible to perform the positioning of the terminal.

According to the positioning method, the positioning system, the correction information generation method, and the correction information generation apparatus of the present disclosure, the correction information is transmitted to the terminal from the reference station via the multi-hop network constituted by the plurality of relay stations.

Accordingly, it is possible to perform the positioning of the terminal even in the multi-hop network in which it is difficult to transmit a large amount of data items.

According to the positioning method, the positioning system, the correction information generation method, and the correction information generation apparatus of the present disclosure, the correction information is not generated for the coordinates of the relay station that does not communicate with the terminal.

Accordingly, it is possible to prevent transmission of unnecessary correction information.

According to the positioning method, the positioning system, the correction information generation method, and the correction information generation apparatus of the present disclosure, the estimated coordinates calculated by the terminal based on the positioning signal from the satellite is acquired, and the correction information is generated based on the estimated information in a case where the available bandwidth between the reference station and the relay station is greater than the predetermined value.

Accordingly, it is possible to generate the correction information having high precision in a case where there is a bandwidth to spare.

According to the positioning method, the positioning system, the correction information generation method, and the correction information generation apparatus of the present disclosure, it is possible to generate the correction information based on the coordinates calculated using the coordinates of the plurality of relay stations in a case where the available bandwidth between the reference station and the relay station is less than the predetermined value.

Accordingly, the necessity for the transmission of the correction information is reduced as many as the number of relay stations in a case where there is a bandwidth to spare. Accordingly, even though a bandwidth capable of being used by the reference station is narrow, it is possible to perform the positioning of the terminal.

Another Exemplary Embodiment

As stated above, Exemplary Embodiment 1 has been described as an example of the technology disclosed in the present application. However, the technology of the present disclosure is not limited thereto, and may be applied to exemplary embodiments acquired by appropriately performing modification, replacement, addition, and omission on the above-described exemplary embodiment. A new exemplary embodiment may be acquired by combining the respective components described in Exemplary Embodiment 1 described above.

The above-described exemplary embodiment is provided to illustrate the technology of the present disclosure, and may be variously modified, replaced, added, and omitted in claims or an equivalent scope.

INDUSTRIAL APPLICABILITY

The present disclosure may be applied to a positioning system provided by a municipality or an individual.

REFERENCE MARKS IN THE DRAWINGS 100 positioning system
110 reference station
120 relay station
130 terminal
201 processor
202 storage unit
203 input unit
204 output unit
205 communicator
206 reception device
210 bus
301 processor
302 storage unit
303 input unit
304 output unit
305 communicator
310 bus
401 processor
402 storage unit
403 input unit
404 output unit
405 communicator
406 reception device
410 bus
601 reference station
611 relay station
612 relay station
613 relay station
614 relay station
615 relay station
616 relay station
621 terminal
622 terminal
623 terminal
624 terminal

The invention claimed is:

1. A positioning method, comprising:
acquiring, at a reference station, information for specifying a relay station communicating with terminals among one or more relay stations, and estimated coordinates of each of the terminals;
determining, at the reference station, whether an available bandwidth between a reference station and the specified relay station is less than a predetermined value;
when the available bandwidth is equal to or less than the predetermined value,
generating, at the reference station, a single piece of correction information of an interferometric positioning method based on coordinates of the specified relay station,
causing the reference station to transmit the single piece of the correction information to the terminals via the specified relay station by multicast, and
causing each of the terminals to calculate coordinates of the each of the terminals by the interferometric positioning method using the single piece of the correction information; and
when the available band width is greater than the predetermined threshold,
generating, at the reference station, a plurality of pieces of correction information of the interferometric positioning method, each of which is generated based on the estimated coordinates of each of the terminals,
causing the reference station to transmit each piece of the correction information to each of the terminals corresponding to the estimated coordinates used to generate the piece of the correction information, and
causing each of the terminals to calculate coordinates of the each of the terminals by the interferometric positioning method using the each piece of the correction information.

2. The positioning method of claim 1,
wherein, in causing the reference station to transmit the single piece of the correction information, the reference station transmits the single piece of correction information to the terminals via a multi-hop network constituted by the one or more relay stations.

3. The positioning method of claim 1,
wherein, in generating the single piece of correction information, the reference station does not generate the single piece of correction information for coordinates of a relay station among the one or more relay stations that is not communicating with the terminals.

4. The positioning method of claim 1,
wherein in generating the single piece of correction information, the reference station calculates the single piece of correction information based on coordinates calculated using coordinates of a plurality of relay stations, including the specified relay station, in a case where an available bandwidth between the reference station and the specified relay station is less than the predetermined value, and
the positioning method further comprising causing each of the terminals communicating with a relay station, other than the specified relay station among the one or more relay stations, to calculate coordinates of the each of the terminals communicating with the relay station other than the specified relay station by the interferometric positioning method using the single piece of the correction information.

5. A positioning system that includes a reference station having a processor, one or more relay stations, and terminals, the positioning system configured to:
acquire, at a reference station, information for specifying a relay station communicating with the terminals among the one or more relay stations, and estimated coordinates of each of the terminals;
determine, at the reference station, whether an available bandwidth between the reference station and the specified relay station is less than a predetermined value;
when the available bandwidth is equal to or less than the predetermined value,
generate, at the reference station, a single piece of correction information of an interferometric positioning method based on coordinates of the specified relay station,
cause the reference station to transmit the single piece of the correction information to the terminals via the specified relay station by multicast, and
cause each of the terminals to calculate coordinates of the each of the terminals by the interferometric positioning method using the single piece of the correction information; and
when the available band width is greater than the predetermined threshold,
generate, at the reference station, a plurality of pieces of correction information of the interferometric positioning method, each of which is generated based on the estimated coordinates of each of the terminals,
cause the reference station to transmit each piece of the correction information to each of the terminals corresponding to the estimated coordinates used to generate the piece of the correction information, and
cause each of the terminals to calculate coordinates of the each of the terminals by the interferometric positioning method using the each piece of the correction information.

6. The positioning system of claim 5,
wherein, in causing the reference station to transmit the single piece of the correction information, the reference station transmits the single piece of correction information to the terminals via a multi-hop network constituted by the one or more relay stations.

7. The positioning system of claim 5,
wherein, in generating the single piece of correction information, the reference station does not generate the single piece of correction information for coordinates of a relay station, among the one or more relay stations that is not communicating with the terminals.

8. The positioning system of claim 5,
wherein in generating the single piece of correction information, the reference station calculates the single piece of correction information based on coordinates calculated using coordinates of a plurality of relay stations, including the specified relay station, in a case where an available bandwidth between the reference station and the specified relay station is less than the predetermined value, and
the positioning system is further configured to
cause each of of terminals communicating with a relay station, other than the specified relay station among the one or more of the relay stations, to calculate coordinates of the each of the terminals communicating with the relay station other than the specified relay station by the interferometric positioning method using the single piece of the correction information.

* * * * *